United States Patent
Deshpande et al.

(10) Patent No.: US 10,915,854 B2
(45) Date of Patent: Feb. 9, 2021

(54) SYSTEM AND METHOD TO INCORPORATE CUSTOMIZED CAPACITY UTILIZATION COST IN BALANCING FULFILLMENT LOAD ACROSS RETAIL SUPPLY NETWORKS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Alan J. King, South Salem, NY (US); Ali Koc, White Plains, NY (US); Yingjie Li, Chappaqua, NY (US); Xuan Liu, Yorktown Heights, NY (US); Christopher S. Milite, Oxford, CT (US); Brian L. Quanz, Yorktown Heights, NY (US); Chek Keong Tan, Danbury, CT (US); Dahai Xing, White Plains, NY (US); Xiaobo Zheng, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 1072 days.

(21) Appl. No.: 15/154,119

(22) Filed: May 13, 2016

(65) Prior Publication Data
US 2017/0206591 A1   Jul. 20, 2017

Related U.S. Application Data

(60) Provisional application No. 62/279,738, filed on Jan. 16, 2016.

(51) Int. Cl.
*G06Q 10/08* (2012.01)
*G06Q 30/02* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC ....... G06Q 10/08345; G06Q 10/06375; G06Q 10/0875; G06Q 10/0838; G06Q 30/0635;
(Continued)

(56) References Cited

U.S. PATENT DOCUMENTS 7,050,938 B1   5/2006   Prater et al.
7,370,005 B1   5/2008   Ham et al.
(Continued)

FOREIGN PATENT DOCUMENTS

WO   2005067434 A2   7/2005

OTHER PUBLICATIONS

Brolin, Sara, "Balancing the Costs for Finished Goods Inventory and production Capacity . . . " <.http://www.pm.lth.se/fileadmin/pm/Exjobb/Filer_fram_till_foerra_aaret/Exjobb_2015/Brolin_Sara/Balancing_the_Costs_for_Finished_Goods_Inventory_and_Production_Capacity_in_a_Make-to-Order_Company_report.pdf>. (Year: 2015).*
(Continued)

*Primary Examiner* — Daniel Vetter
*Assistant Examiner* — Manal A. Alsamiri
(74) *Attorney, Agent, or Firm* — Scully, Scott, Murphy & Presser, PC; Joseph Petrokaitis, Esq.

(57) ABSTRACT

A method and system for considering customized capacity utilization cost in node order fulfillment. The method includes receiving by a customized capacity utilization cost module an electronic record of a current order. The method includes retrieving data of a plurality of nodes and calculating an actual capacity utilization. The method includes automatically converting the actual capacity utilization of each node of the plurality of nodes and a predetermined
(Continued)

maximum amount of cost to balance capacity utilization across the plurality of nodes into a customized capacity utilization cost, and transmitting the customized capacity utilization cost to an order fulfillment engine. The method includes receiving by the order fulfillment engine the current order, the processing cost data, and the customized capacity utilization cost. The method includes automatically calculating a fulfillment cost and identifying a node-order assignment with the lowest fulfillment cost.

12 Claims, 6 Drawing Sheets

(51) Int. Cl.

| | | |
|---|---|---|
| G06N 20/00 | (2019.01) | |
| G06F 16/14 | (2019.01) | |
| G06F 16/182 | (2019.01) | |
| G06F 16/17 | (2019.01) | |
| G06F 16/23 | (2019.01) | |
| G06N 5/00 | (2006.01) | |
| G06F 3/0482 | (2013.01) | |
| G06F 3/0484 | (2013.01) | |
| G06Q 30/06 | (2012.01) | |
| H04L 12/26 | (2006.01) | |
| G06N 5/04 | (2006.01) | |
| G06Q 10/06 | (2012.01) | |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
CPC .......... G06Q 30/0283; G06Q 30/0201; G06Q 10/083; G06Q 10/087; G06Q 10/06315; G06Q 10/0833; G06Q 30/0206; G06Q 10/0633; G06Q 30/0284; G06F 16/1844; G06F 16/2365; G06F 16/148; G06F 16/183; G06F 16/1734; G06F 3/0482; G06F 3/04847; G06N 20/00; G06N 5/04; G06N 5/045; H04L 43/16; H04L 43/0882; H04L 43/0876
See application file for complete search history.

(56) References Cited

U.S. PATENT DOCUMENTS

| | | |
|---|---|---|
| 7,917,387 B2 | 3/2011 | Spurr et al. |
| 8,015,081 B1 | 9/2011 | Franco |
| 8,046,262 B1 | 10/2011 | Antony et al. |
| 8,065,172 B2 | 11/2011 | Mauthe et al. |
| 8,204,799 B1 | 6/2012 | Murray et al. |
| 8,249,917 B1* | 8/2012 | Kassmann ......... G06Q 30/0601 705/12 |
| 8,352,382 B1 | 1/2013 | Katta et al. |
| 8,374,922 B1 | 2/2013 | Antony |
| 8,428,988 B1* | 4/2013 | Braumoeller ........ G06Q 10/063 705/7.11 |
| 8,626,333 B2 | 1/2014 | Waddington et al. |
| 8,818,836 B1 | 8/2014 | Braumoeller et al. |
| 2002/0019759 A1 | 2/2002 | Krunapuram et al. |
| 2002/0032573 A1 | 3/2002 | Williams et al. |
| 2003/0093388 A1 | 5/2003 | Albright |
| 2007/0130201 A1 | 6/2007 | Ratliff et al. |
| 2009/0254447 A1 | 10/2009 | Blades |
| 2011/0213650 A1 | 9/2011 | Mesaros |
| 2012/0029974 A1* | 2/2012 | Councill ............ G06Q 10/0631 705/7.35 |
| 2012/0150583 A1 | 6/2012 | Dueck et al. |
| 2012/0150692 A1 | 6/2012 | Dueck et al. |
| 2014/0047342 A1* | 2/2014 | Breternitz ............ G06F 9/5061 715/735 |
| 2014/0136255 A1 | 5/2014 | Grabovski et al. |
| 2015/0052019 A1* | 2/2015 | Field-Darraugh .......................... G06Q 30/0635 705/26.62 |

OTHER PUBLICATIONS

Office Action dated Jan. 25, 2019 from related U.S. Appl. No. 15/153,963, filed May 13, 2016.
Office Action dated Jul. 27, 2018 from related U.S. Appl. No. 15/153,963.
Acimovic, J. A., "Lowering Outbound Shipping Costs in an Online Retail Environment by Making Better Fulfillment and Replenishment Decisions", Aug. 2012, pp. 1-198, MIT PhD thesis.
Kewill Corporation, "Omni-channel Optimization for Retailers: Fulfillment best practice to deliver on customer promises and drive down returns", Jul. 2013, pp. 1-12.
Xu, P. J., "Order Fulfillment in Online Retailing: What Goes Where", Sep. 2005, pp. 1-146, MIT Thesis.
Mell, P., et al., "The NIST Definition of Cloud Computing", NIST Special Publication 800-145, National Institute of Standards and Technology, U.S. Department of Commerce, Sep. 2011, pp. 1-7.
IBM Corporation, "IBM Sterling Order Management", Aug. 15, 2014, pp. 1-5.
Office Action dated Sep. 28, 2020 from related U.S. Appl. No. 15/153,963, filed May 13, 2016.

* cited by examiner

SYSTEM AND METHOD TO INCORPORATE CUSTOMIZED CAPACITY UTILIZATION COST IN BALANCING FULFILLMENT LOAD ACROSS RETAIL SUPPLY NETWORKS

CROSS REFERENCE TO RELATED PATENTS AND APPLICATIONS

This application claims priority from U.S. Provisional Application No. 62/279,738 filed on Jan. 16, 2016.

BACKGROUND

This disclosure is directed to computer generated node order fulfillment performance and more particularly, to computer generated node order fulfillment performance considering customized capacity utilization cost.

Omni-channel retailers employ a number of channels to fulfill online orders. One approach to find optimal fulfillment solutions is to model the fulfillment problem as a multi-objective optimization problem, where the solution is order item assignments across a large number of fulfillment candidate nodes (stores, ecommerce fulfillment centers, etc.). That is, the assignment of the items of the order to one or more nodes or packages at a node, for example one item in the order may be assigned to one node, and another item may be assigned to a different node.

A key issue when assigning a part of an order to a node for fulfillment is that the order can get backlogged due to limited node capacity, that is, the processing throughput of the laborers who can pick the items at the node and fulfill the order. Node capacity is especially a problem when non-traditional fulfillment nodes are considered in the node fulfillment decision such as stores in the recent ship-from-store trend. On the other hand, nodes can remain underutilized—having more capacity available than is being used. Therefore, factoring in the capacity utilization of a node would be useful for balancing fulfillment load across retail supply networks and avoiding costly delays due to overloading the current resources of the node.

SUMMARY OF THE INVENTION

One embodiment is directed to a method for determining a customized capacity utilization cost as a measure of order fulfillment performance. The method includes receiving by a computer processor of a customized capacity utilization cost module an electronic record of a current order from a customer. Then, the program instructions executed by the processor of the customized capacity utilization cost module allows the module to retrieve data of each node from a plurality of nodes. The method then includes automatically calculating an actual capacity utilization of each node of the plurality of nodes. The actual capacity utilization is based on the retrieved current capacity utilization, the capacity of a current day as well as future days, and the backlog. Further, the method includes automatically converting the actual capacity utilization of each node of the plurality of nodes and a predetermined maximum amount of cost to balance capacity utilization across the plurality of nodes into a customized capacity utilization cost for each node using the customized capacity utilization cost module. The method then includes transmitting the customized capacity utilization cost of each node to an order fulfillment engine.

The method continues with receiving by a computer processor of the order fulfillment engine the electronic record of the current order for node order assignment, retrieving by the computer processor of the order fulfillment engine the processing cost (including shipping and handling) data of each node from a plurality of nodes, and receiving by the computer processor of the order fulfillment engine the customized capacity utilization cost of each node from a plurality of nodes. The method next includes automatically calculating a fulfillment cost of each assignment to each of one or more nodes of the plurality of nodes of the current order based on the processing cost data of each node from the plurality of nodes and the customized capacity utilization cost of each node from a plurality of nodes. Further, the method includes identifying one or more assignments to one or more nodes from the plurality of nodes of the current order with the lowest fulfillment cost based on the calculated fulfillment cost. Finally, the method includes generating a node order assignment assigning the current order to one or more nodes, and selecting the assignment with the lowest fulfillment cost.

In one embodiment, the actual capacity utilization is an estimation of how many days it would require to process all assigned units to a node, given its planned capacity for the current and future days. This is calculated by first computing the total assigned, unprocessed units to a node for the current day. This is equal to the total number of beginning-of-day backlog units for the node, plus the number of units assigned to the node so far that day—which is obtained by multiplying the current capacity utilization by the capacity of a current day for the node. To get the actual utilization of the node, the number of days required to process all unprocessed units is calculated given the planned capacity per day. That is, starting with the planned capacity of the current day and the actual capacity utilization equal to 0, the planned capacity of each day is subtracted from the current unprocessed unit total and a value of 1 is added to the actual capacity utilization, until there are fewer unprocessed units then planned capacity for a day. Then finally the number of remaining unprocessed units is divided by the planned capacity of the final day and added to the actual capacity utilization. For example, if there are a total of 14 unprocessed units assigned to a node, and its planned capacity for the current day is 100 units, then its actual capacity utilization would be 0.14. If instead its capacity for the current day is 4 units, its planned capacity for the next day is 5 units, and its planned capacity for the day after that is 10 units, then its actual capacity utilization would be 2.5—since 5 unprocessed units would still remain after the first 2 days' worth of processing, and the planned capacity on the final day is 10. In another embodiment, the customized capacity utilization cost is calculated by dividing the square of the actual capacity utilization by a total number of items in the current order, and multiplying the predetermined maximum amount of cost to increase balance. In another embodiment, the customized capacity utilization cost is further based on a normalized actual capacity utilization, where the actual capacity utilization per node is normalized across nodes so that the maximum value is 1. This can be accomplished in a number of ways, in one embodiment this is accomplished by dividing the actual capacity utilization of each node by the minimum of 1 and the maximum actual capacity utilization of all nodes under consideration.

In one embodiment, the customized capacity utilization cost further considers a predetermined threshold for increasing the customized capacity utilization cost of each node of the plurality of nodes and an over-capacity cost of each node of the plurality of nodes. In another embodiment, the customized capacity utilization cost is calculated by adding 1 to the actual capacity utilization and subtracting the predetermined threshold for increasing the customized capacity utilization cost, if the actual capacity utilization is greater than the threshold, multiplying the over-capacity cost, and dividing the total number of items in the current order. If the actual capacity utilization is less than the threshold, no additional cost is added.

One embodiment is directed to a customized capacity utilization cost module. The customized capacity utilization cost module include one or more non-transitory computer readable storage media and program instructions, stored on the one or more non-transitory computer-readable storage media, which when implemented by a user interface accessing a service provider website, cause the computer system to perform the step of receiving by a computer processor of a customized capacity utilization cost module an electronic record of a current order from a customer. Then, the program instructions executed by the processor of the customized capacity utilization cost module allows the module to retrieve data of each node from a plurality of nodes. The method then includes automatically calculating an actual capacity utilization of each node of the plurality of nodes. The actual capacity utilization is based on the retrieved current capacity utilization, the capacity of a current day as well as future days, and the backlog. Further, the method includes automatically converting the actual capacity utilization of each node of the plurality of nodes and a predetermined maximum amount of cost to balance capacity utilization across the plurality of nodes into a customized capacity utilization cost for each node using the customized capacity utilization cost module. The method then includes transmitting the customized capacity utilization cost of each node to an order fulfillment engine. The method continues with receiving by a computer processor of the order fulfillment engine the electronic record of the current order for node order assignment, retrieving by the computer processor of the order fulfillment engine the processing cost (including shipping and handling) data of each node from a plurality of nodes, and receiving by the computer processor of the order fulfillment engine the customized capacity utilization cost of each node from a plurality of nodes. The method next includes automatically calculating a fulfillment cost of each assignment of the items of the current order to each node of the plurality of nodes based on the processing cost data of each node from the plurality of nodes and the customized capacity utilization cost of each node from a plurality of nodes. Further, the method includes identifying one or more assignment to one or more nodes from the plurality of nodes of the current order with the lowest fulfillment cost based on the calculated fulfillment cost. Finally, the method includes generating a node order assignment assigning the current order to one or more of the one or more nodes, selecting the assignment with the lowest fulfillment cost.

One embodiment of the invention is directed to a non-transitory article of manufacture tangibly embodying computer readable instructions, which when implemented by a user interface accessing a service provider website, cause the computer system to perform the step of receiving by a computer processor of a customized capacity utilization cost module an electronic record of a current order from a customer. Then, the program instructions executed by the processor of the customized capacity utilization cost module allows the module to retrieve data of each node from a plurality of nodes. The method then includes automatically calculating an actual capacity utilization of each node of the plurality of nodes. The actual capacity utilization is based on the retrieved current capacity utilization, the capacity of a current day as well as future days, and the backlog. Further, the method includes automatically converting the actual capacity utilization of each node of the plurality of nodes and a predetermined maximum amount of cost to balance capacity utilization across the plurality of nodes into a customized capacity utilization cost of the each node using the customized capacity utilization cost module. The method then includes transmitting the customized capacity utilization cost of each node to an order fulfillment engine. The method continues with receiving by a computer processor of the order fulfillment engine the electronic record of the current order for node order assignment, retrieving by the computer processor of the order fulfillment engine the processing cost (including shipping and handling) data of each node from a plurality of nodes, and receiving by the computer processor of the order fulfillment engine the customized capacity utilization cost of each node from a plurality of nodes. The method next includes automatically calculating a fulfillment cost of assignment of the items of the current order to each node of the plurality of nodes based on the processing cost data of each node from the plurality of nodes and the customized capacity utilization cost of each node from a plurality of nodes. Further, the method includes identifying one or more assignment to one or more nodes from the plurality of nodes of the current order with the lowest fulfillment cost based on the calculated fulfillment cost. Finally, the method includes generating a node order assignment assigning the current order to one or more of the one or more nodes, selecting the assignment with the lowest fulfillment cost.

BRIEF DESCRIPTION OF THE DRAWINGS

These are other objects, features and advantages of the present invention will become apparent from the following detailed description, which is to be read in connection with the accompanying drawing, in which.

DETAILED DESCRIPTION

This is a system and method for evaluating customized capacity utilization cost in node order assignment. This invention incorporates customized capacity utilization cost into a calculation of fulfillment cost in a fulfillment engine, for example, into a multi-objective optimization-based engine when balancing a number of objectives for node order assignment. The invention derives a mathematical modeling approach enabling the incorporation of the customized capacity utilization cost into a fulfillment engine, and a methodology for converting the raw retail data into a calculable fulfillment capacity utilization cost. This invention enables providing a real dollar cost for load balancing based on future predicted/expected cost, and thus enables trading off with other order fulfillment objectives that have real dollar values such as shipping cost.

Customized capacity utilization cost is modeled in such a way that in general, the node with lower cumulative capacity utilization is preferred, or, given equal current capacity consumption, the node with higher capacity is preferred. When calculating a customized capacity utilization cost, the weight applied to the capacity utilization can be adjusted to trade-off between improving fulfillment capacity utilization with other business objectives, such as lowering shipping cost.

By factoring in the customized capacity utilization cost in fulfillment decisions and adjusting the weight of capacity utilization in deciding node order performance, retailers are able to balance the workload between fulfillment nodes with more flexibility to their own business objectives. Customized capacity utilization cost can be based on a preset maximum amount of cost to balance capacity utilization across the plurality of nodes, an over-capacity cost, or a threshold for increasing the customized capacity utilization cost. Further, retailers are able to reduce labor cost from extra workers hired for order fulfillment at a node beyond its capacity or avoid future delaying or upgrading of orders due to failure of an over-loaded node to process (pick, pack, and ship) all orders on time.

Figure 1A:
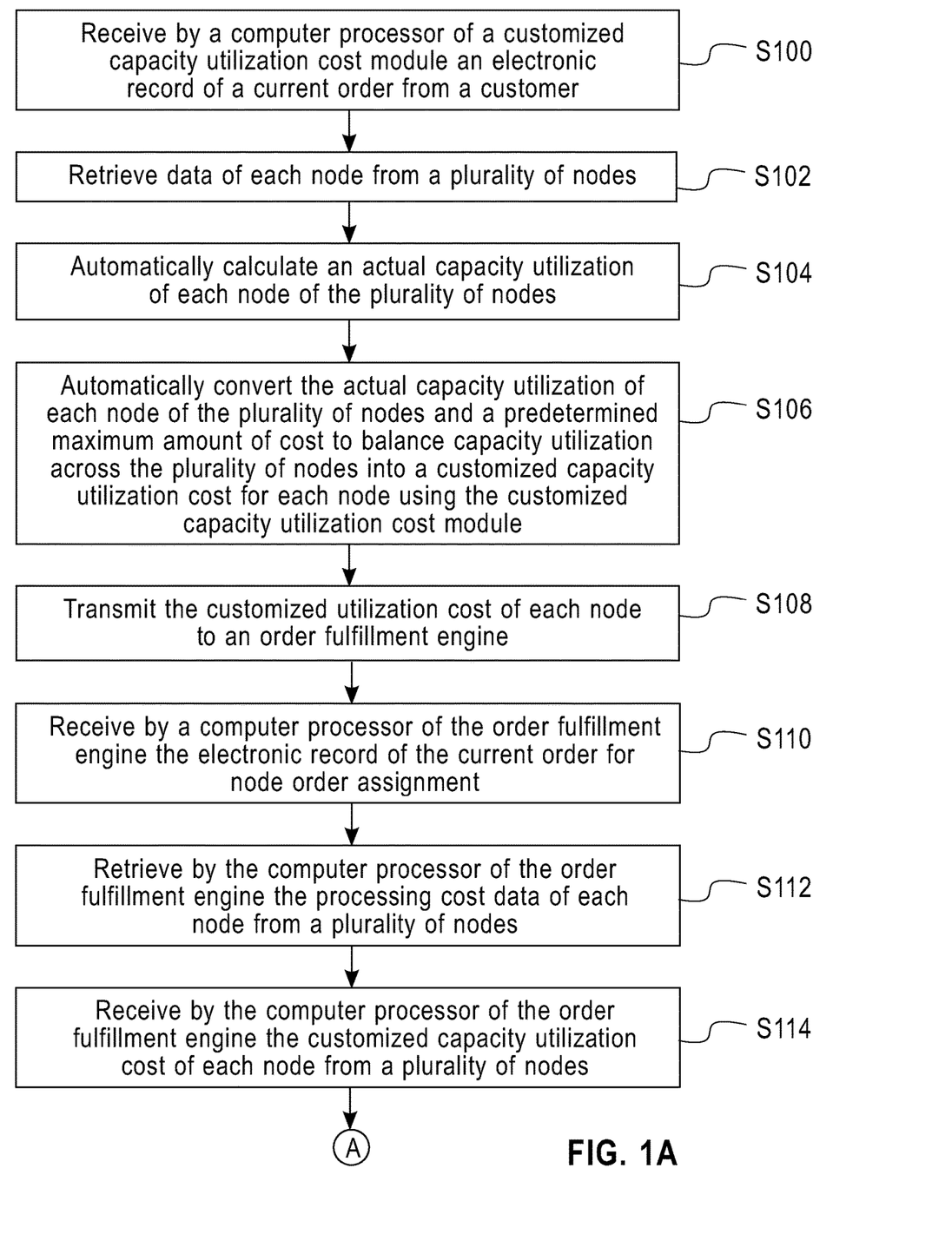
FIG. 1A and FIG. 1B is a flow diagram of the steps of one embodiment of the method of the invention.

As is shown in FIG. 1A, one embodiment of the method of the invention begins with step S100 of receiving by a computer processor of a customized capacity utilization cost module an electronic record of a current order from a customer. The computer processor of the customized capacity utilization cost module has program instructions. At step S102, the program instructions executed by the processor of the customized capacity utilization cost module allows the module to retrieve data of each node from a plurality of nodes. The retrieved data of each node comprises current capacity utilization, capacity of a current day as well as future days, and backlog. Capacity of a day, current or future, is a planned capacity in units for the day—that is the number of units the retailer expects to be able to process that day at that node, based on labor plans they have made for that node and day. Current capacity utilization is the percentage of total daily capacity used so far in a current day and is calculated from the number of units assigned for processing so far in a current day divided by the capacity of that current day. Current capacity utilization is updated regularly, for example, based on a predetermined time interval or real time. Continuous order assignment to a node increases capacity utilization of that node. Backlog is the backlog units at the beginning of the current day.

At step S104, the module automatically calculates an actual capacity of each node of the plurality of nodes. The actual capacity utilization is based on the retrieved current capacity utilization, the capacity of a current day as well as future days, and the backlog. The actual capacity utilization differs from the current capacity utilization by taking backlog and future days' capacities into consideration. The actual capacity utilization is the capacity utilization of the current time—at the current point in time, the capacity utilization of the node. It is based on what the node can process over a number of days, as the utilization can be greater than 100%.

The actual utilization goes beyond the plan of the current day and also depends on the plan of future days. For example, say the planned capacity of the current day is only 10 units. If the current utilization is at 20 units, we need to consider the future planned capacity to get the actual capacity utilization. In this case we used 100% of the first day so utilization is at least 1—this is the number we will add to. Now we subtract the planned units from the first day leaving 10 units. Now we look at the next day's planned capacity. Say it is 2 units only. Then we are at least at 2 (200%) capacity utilization, since we will also use all of the next day's planned capacity as well. Subtracting 2 units, we have 8 remaining units, so we look at the third day's planned capacity (2 days in the future). Say the planned capacity for that day is 16 units. Then on that day we use $8/16=0.5$ of the capacity—we don't exhaust its capacity, so we can stop here. Therefore our total capacity utilization is $=1+1+0.5=2.5$ (250%).

Further at step S106, the module automatically converts the actual capacity utilization of each node of the plurality of nodes and a predetermined maximum amount of cost to balance capacity utilization across the plurality of nodes into a customized capacity utilization cost of the each node using the customized capacity utilization cost module. The predetermined maximum amount of cost to balance capacity utilization across the plurality of nodes is an amount of money that retailers are willing to trade-off with higher shipping cost (or total other cost) from a node, in order to balance the capacity utilization of the plurality of nodes across the network. To balance the capacity utilization across a plurality of nodes, more items in current orders are assigned to the nodes that are under-utilized (reward orders to nodes with low capacity utilization), and/or items in current orders are not assigned to the nodes that are over-utilized (penalize orders to nodes with high capacity utilization). The predetermined maximum amount of cost to balance capacity utilization across the plurality of nodes can be customized according to retailer's own business objectives, in order to convert into a customized capacity utilization cost, which adjusts to retailer's business needs. An example of the predetermined maximum amount of cost to balance capacity utilization cost across the plurality of nodes is to set it as 0.1, which provides a tie-breaking strategy when the shipping cost of two of the nodes from the plurality of nodes are the same.

Then at step S108, the module transmits the customized capacity utilization cost of each node to an order fulfillment engine. The order fulfillment engine can be a multi-objective optimization-based engine to balance a number of objectives, e.g. shipping cost, customized capacity utilization cost, etc., for node order assignment.

The method continues with receiving by a computer processor of the order fulfillment engine the electronic record of the current order for node order assignment at step S110, retrieving by the computer processor of the order fulfillment engine the processing cost data of each node from a plurality of nodes at step S112, and receiving by the computer processor of the order fulfillment engine the customized capacity utilization cost of each node from a plurality of nodes at step S114. Processing cost data is the cost to process an order without considering the customized capacity utilization cost. Processing cost can include shipping and handling cost, cancellation cost, etc.

Figure 1B:
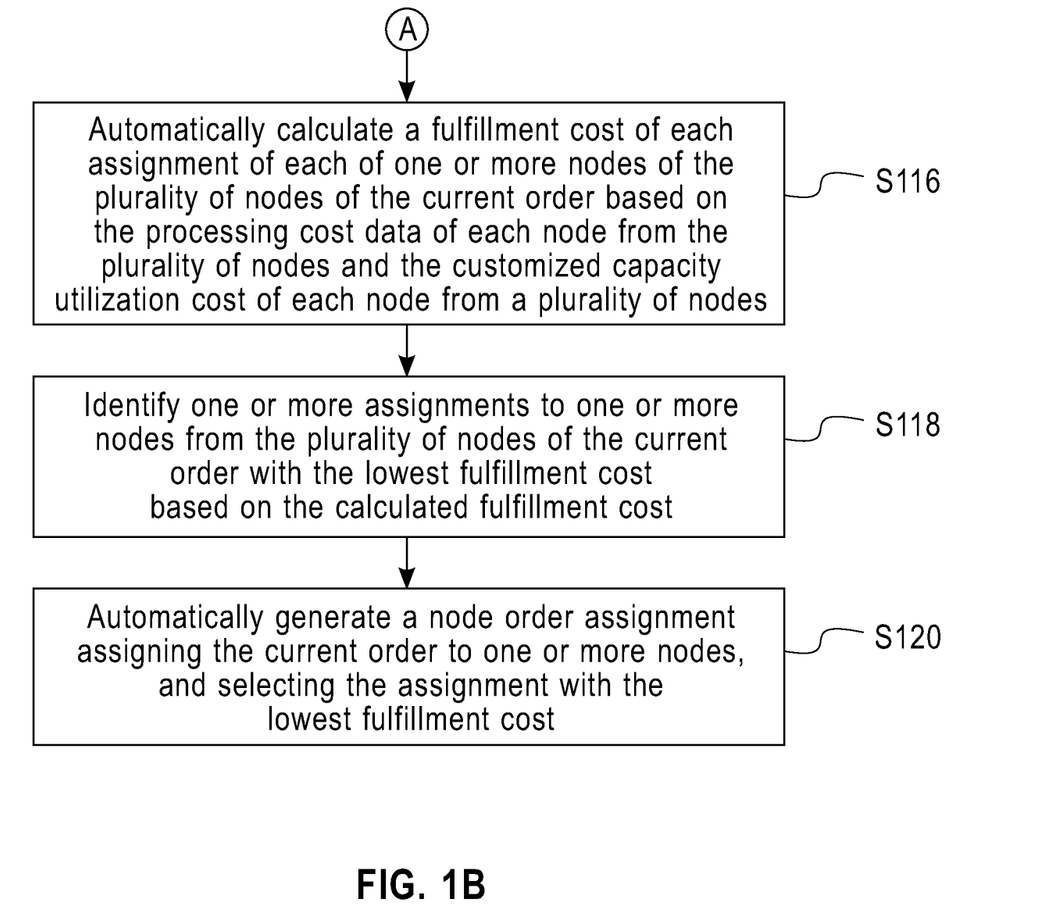

As is shown in FIG. 1B, at step S116, the order fulfillment engine automatically calculates a fulfillment cost of each assignment of the items of the current order to each node of the plurality of nodes based on the processing cost data of each node from the plurality of nodes and the customized capacity utilization cost of each node from a plurality of nodes.

Further at step S118, the order fulfillment engine identifies one or more assignment to one or more nodes from the plurality of nodes of the current order with the lowest fulfillment cost based on the calculated fulfillment cost. Finally, at step S120, the order fulfillment engine generates a node order assignment assigning the current order to one or more of the one or more nodes, selecting the assignment with the lowest fulfillment cost.

In one embodiment, the actual capacity utilization is an estimation of how many days it would require to process all assigned units to a node, given its planned capacity for the current and future days. This is calculated by first computing the total assigned, unprocessed units to a node for the current day. This is equal to the total number of beginning-of-day backlog units for the node, plus the number of units assigned to the node so far that day—which is obtained by multiplying the current capacity utilization by the capacity of a current day for the node. To get the actual utilization of the node, the number of days required to process all unprocessed units is calculated given the planned capacity per day. That is, starting with the planned capacity of the current day and the actual capacity utilization equal to 0, the planned capacity of each day is subtracted from the current unprocessed unit total and a value of 1 is added to the actual capacity utilization, until there are fewer unprocessed units then planned capacity for a day. Then finally the number of remaining unprocessed units is divided by the planned capacity of the final day and added to the actual capacity utilization. For example, if there are a total of 14 unprocessed units assigned to a node, and its planned capacity for the current day is 100 units, then its actual capacity utilization would be 0.14. If instead its capacity for the current day is 4 units, its planned capacity for the next day is 5 units, and its planned capacity for the day after that is 10 units, then its actual capacity utilization would be 2.5—since 5 unprocessed units would still remain after the first 2 days' worth of processing, and the planned capacity on the final day is 10.

In another embodiment, the customized capacity utilization cost is calculated by dividing the square of the actual capacity utilization by a total number of items in the current order, and multiplying the predetermined maximum amount of cost to increase balance. When the actual capacity utilization is a fraction less than 1, the customized capacity utilization cost will be a limitation on the maximum capacity utilization cost, which contributes to the order fulfillment cost. One example of the calculation is shown in Table 1 below.

TABLE 1

Customized Capacity Utilization Cost at node n = d × f (ACUn)
f (ACUn) = d × ACUn²/s Where:
d = maximum amount of cost willing to sacrifice in shipping cost to balance capacity utilization across the network
s = total number of items in a current order
ACUn = actual capacity utilization at node n In another embodiment, the customized capacity utilization cost is further based on a normalized actual capacity utilization, where the actual capacity utilization per node is normalized across nodes so that the maximum value is 1. This can be accomplished in a number of ways, in one embodiment this is accomplished by dividing the actual capacity utilization of each node by the minimum of 1 and the maximum actual capacity utilization of all nodes under consideration. This guarantees that, even when there are nodes over a day's capacity, the maximum capacity utilization cost is limited.

In one embodiment, the customized capacity utilization cost further considers a predetermined threshold for increasing the customized capacity utilization cost of each node of the plurality of nodes and an over-capacity cost of each node of the plurality of nodes. The predetermined threshold for increasing the customized capacity utilization cost and the over-capacity cost can be set by retailers according to their business needs. A predetermined threshold close to the actual capacity utilization gives more penalty to a node (avoid assigning items/orders to a node) due to high risk of costly cancellation, heavy backlog, etc.

In another embodiment, the customized capacity utilization cost is calculated by adding 1 to the actual capacity utilization and subtracting the predetermined threshold for increasing the customized capacity utilization cost, if the actual capacity utilization is greater than the threshold, multiplying the over-capacity cost, and dividing the total number of items in the current order. If the actual capacity utilization is less than the threshold, no additional cost is added. One example of the calculation is shown in Table 2 below.

TABLE 2

Figure 2:
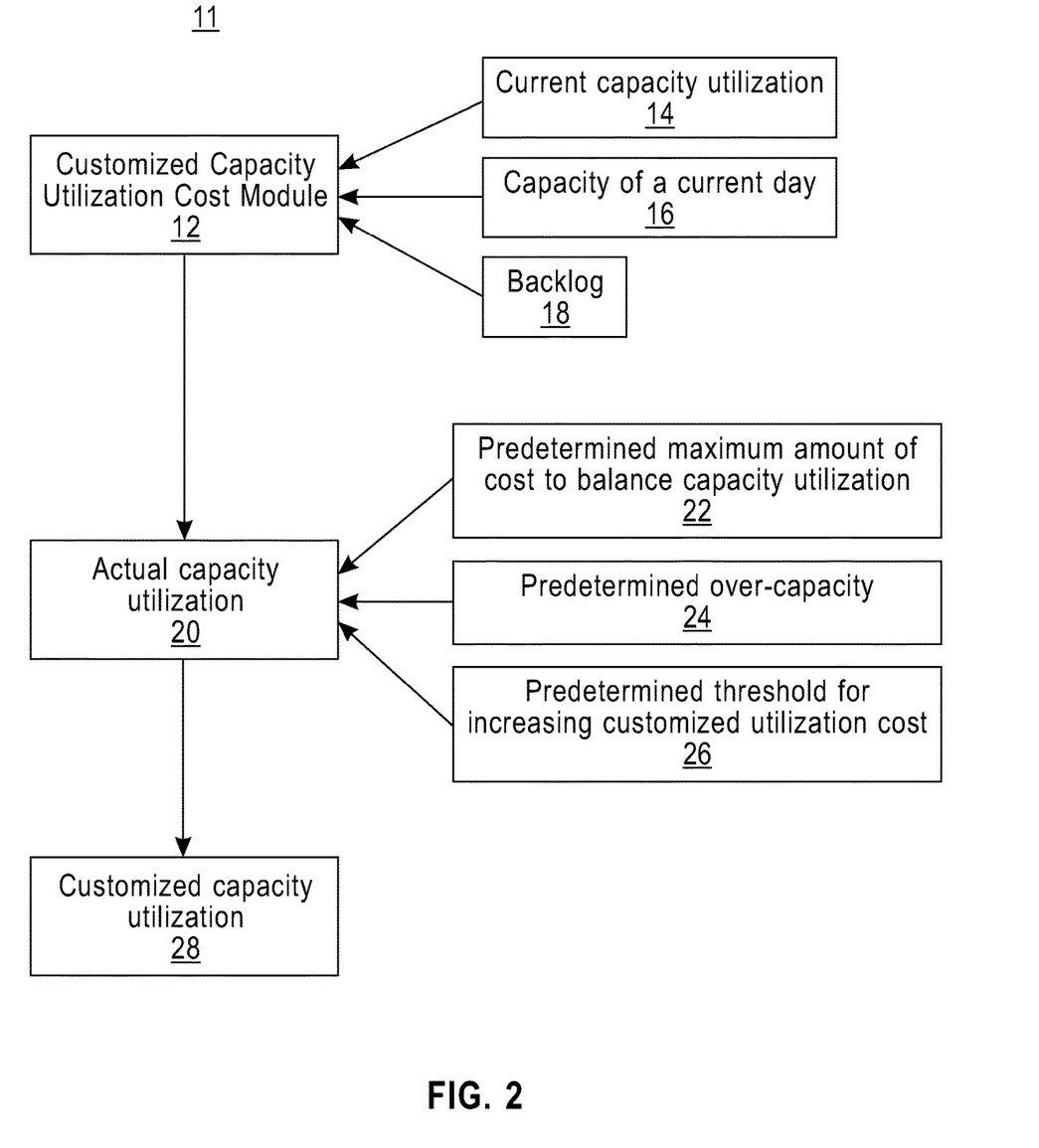
FIG. 2 is a block diagram of one embodiment of the system of the invention.

Customized Capacity Utilization Cost at node n = o × g (ACUn), if ACUn > th
g (ACUn) = o × (1 + ACUn − th)/s, if ACUn > th Where:
s = total number of items in a current order
ACUn = actual capacity utilization at node n
o = over-capacity cost
th = threshold for heavier penalty of high risk of cancellation nodes As is shown in FIG. 2, the diagram depicts one embodiment of the customized capacity utilization cost system 11. The customized capacity utilization cost module 12 considers current capacity utilization 14, capacity of a current day as well as future days 16, and backlog 18 to determine an actual capacity utilization 20. Further input to the customized capacity utilization cost module 12 is a predetermined maximum amount of cost to balance capacity utilization across nodes 22, a customized over-capacity cost 24 and a predetermined threshold for increasing customized capacity utilization cost 26. The module 12 automatically calculates a customized capacity utilization cost 28.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 3:
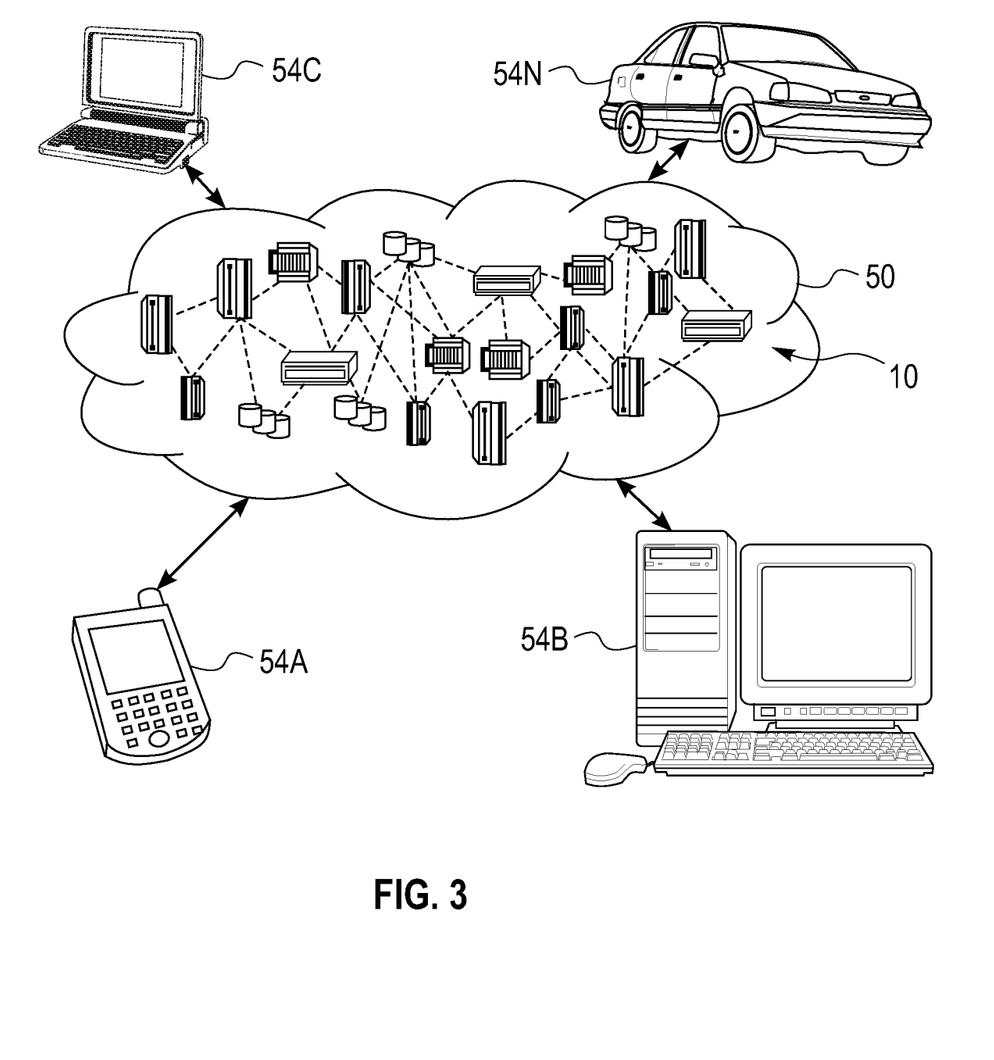
FIG. 3 depicts a cloud computing environment according to an embodiment of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
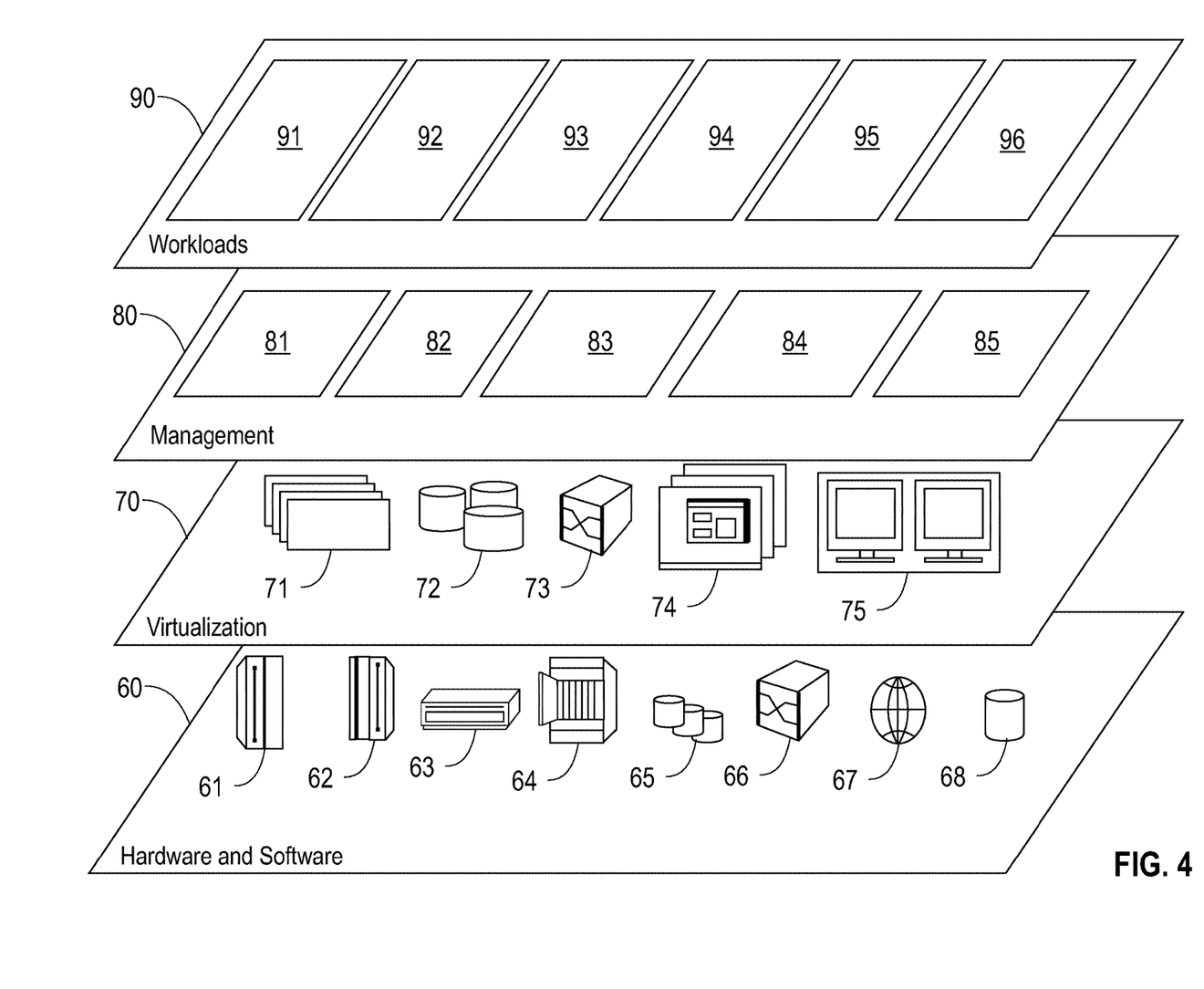
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment maybe utilized. Examples of workloads and functions which may be provided from this layer include: mapping and navigation 91; software development and lifecycle management 92; virtual classroom education delivery 93; data analytics processing 94; transaction processing 95; and order fulfillment optimization 96.

Figure 5:
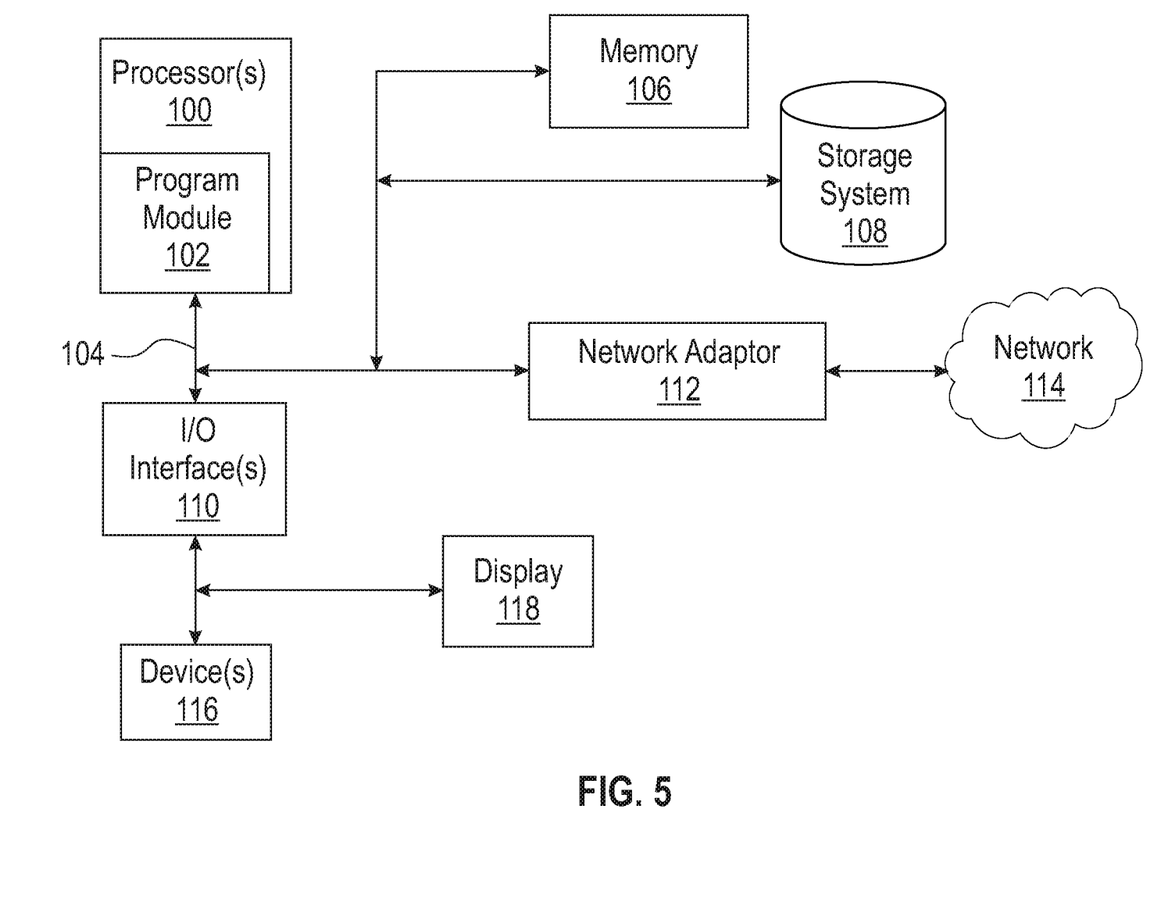
FIG. 5 is a block diagram of an exemplary computing system suitable for implementation of this invention.

FIG. 5 illustrates a schematic of an example computer or processing system that may implement the method for evaluating node fulfillment capacity in node order assignment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for generating node order assignment, comprising:

receiving by a computer processor of a customized capacity utilization cost module an electronic record of a current order from a customer at a current time, the computer processor of the customized capacity utilization cost module having program instructions, which when executed by the processor of the customized capacity utilization cost module, performs the steps of:

retrieving data of each node from a plurality of nodes, the retrieved data of each node comprising, capacity of a current day and future days, and backlog;

determining current capacity utilization for each node, the current capacity utilization being the percentage of total daily capacity of each node used so far in a current day;

continuously updating the current capacity utilization;

automatically calculating an actual capacity utilization of each node of the plurality of nodes at the current time, the actual capacity utilization being based on the updated current capacity utilization of each node at the current time, the capacity of a current day and future days of each node, and the backlog of each node;

automatically converting the actual capacity utilization of each node of the plurality of nodes and a predetermined maximum amount of cost into a customized capacity utilization cost of the each node using the customized capacity utilization cost module, the predetermined maximum amount of cost is selected to balance capacity utilization across the plurality of nodes;

determining whether the customized capacity utilization cost of the each node is above a predetermined threshold;

obtaining a customized over-capacity cost and increasing the customized capacity utilization cost of the each node when the customized capacity utilization cost is above the predetermined threshold, the increased customized capacity utilization cost being calculated by adding 1 to the actual capacity utilization, subtracting the predetermined threshold, multiplying by the over-capacity cost and dividing by the total number of items in the current order; and transmitting the customized capacity utilization cost and, when the customized capacity utilization cost is above the predetermined threshold, the increased customized capacity utilization cost, of each node to an order fulfillment engine;

receiving by a computer processor of the order fulfillment engine the electronic record of the current order for node order assignment;

retrieving by the computer processor of the order fulfillment engine the processing cost data of each node from a plurality of nodes, receiving by the computer processor of the order fulfillment engine the customized capacity utilization cost and, when the customized capacity utilization cost is above the predetermined threshold, the increased customized capacity utilization cost, of each node from a plurality of nodes;

automatically calculating a fulfillment cost of each assignment to each of one or more nodes of the plurality of nodes of the current order based on the processing cost data of each node from the plurality of nodes and the customized capacity utilization cost and, when the customized capacity utilization cost is above the predetermined threshold, the increased customized capacity utilization cost, of each node from a plurality of nodes;

identifying one or more assignment to one or more nodes from the plurality of nodes of the current order with the lowest fulfillment cost based on the calculated fulfillment cost; and automatically generating a node order assignment assigning the current order to one or more of the one or more nodes with the lowest fulfillment cost.

2. The method of claim 1, wherein the actual capacity utilization is calculated by determining the number of days required to process all unit assigned to a node based on the current utilization and capacity of a current day, the backlog, and the planned capacity of future days.

3. The method of claim 1, wherein the customized capacity utilization cost is calculated by dividing the square of the actual capacity utilization by a total number of items in the current order, and multiplying the predetermined maximum amount of cost to increase balance.

4. The method of claim 1, wherein the customized capacity utilization cost is further calculated from a normalized actual capacity utilization, computed by normalizing the actual capacity utilization per node across all nodes under consideration so that the maximum value is 1.

5. A computer system for generating node order assignment, comprising:

a processor; and a memory having program instructions, which when executed by the processor cause a network average capacity utilization cost module to perform the steps of:

receiving by a computer processor of a customized capacity utilization cost module an electronic record of a current order from a customer at a current time, the computer processor of the customized capacity utilization cost module having program instructions, which when executed by the processor of the customized capacity utilization cost module, performs the steps of:

retrieving data of each node from a plurality of nodes, the retrieved data of each node comprising capacity of a current day and future days, and backlog;

determining current capacity utilization for each node, the current capacity utilization being the percentage of total daily capacity of each node used so far in a current day;

continuously updating the current capacity utilization;

automatically calculating an actual capacity utilization of each node of the plurality of nodes at the current time, the actual capacity utilization being based on the updated current capacity utilization of each node at the current time, the capacity of a current day and future days of each node, and the backlog of each node;

automatically converting the actual capacity utilization of each node of the plurality of nodes and a predetermined maximum amount of cost into a customized capacity utilization cost of the each node using the customized capacity utilization cost module, the predetermined maximum amount of cost is selected to balance capacity utilization across the plurality of nodes;

determining whether the customized capacity utilization cost of the each node is above a predetermined threshold;

obtaining a customized over-capacity cost and increasing the customized capacity utilization cost of the each node in which the customized capacity utilization cost is above the predetermined threshold, the increased customized capacity utilization cost being calculated by adding 1 to the actual capacity utilization, subtracting the predetermined threshold, multiplying by the over-capacity cost and dividing by the total number of items in the current order; and transmitting one of the customized capacity utilization cost and, when the customized capacity utilization cost is above the predetermined threshold, the increased customized capacity utilization cost, of each node to an order fulfillment engine, the fulfillment engine having a computer processor and a memory, the memory having program instructions, which, when executed, cause the processor to perform the steps of:

receiving by a computer processor of the order fulfillment engine the electronic record of the current order for node order assignment;

retrieving by the computer processor of the order fulfillment engine the processing cost data of each node from a plurality of nodes, receiving by the computer processor of the order fulfillment engine the customized capacity utilization cost and, when the customized capacity utilization cost is above the predetermined threshold, the increased customized capacity utilization cost, of each node from a plurality of nodes;

automatically calculating a fulfillment cost of each assignment to each of one or more nodes of the plurality of nodes of the current order based on the processing cost data of each node from the plurality of nodes and the customized capacity utilization cost and, when the customized capacity utilization cost is above the predetermined threshold, the increased customized capacity utilization cost, of each node from a plurality of nodes;

identifying one or more assignments to one or more nodes from the plurality of nodes of the current order with the lowest fulfillment cost based on the calculated fulfillment cost; and automatically generating a node order assignment assigning the current order to one or more nodes, selecting the assignment with the lowest fulfillment cost.

6. The computer system of claim 5, wherein the actual capacity utilization is calculated by determining the number of days required to process all unit assigned to a node based on the current utilization and capacity of a current day, the backlog, and the planned capacity of future days.

7. The computer system of claim 5, wherein the customized capacity utilization cost is calculated by dividing the square of the actual capacity utilization by a total number of items in the current order, and multiplying the predetermined maximum amount of cost to increase balance.

8. The computer system of claim 5, wherein the customized capacity utilization cost is further calculated from a normalized actual capacity utilization, computed by normalizing the actual capacity utilization per node across all nodes under consideration so that the maximum value is 1.

9. A non-transitory article of manufacture tangibly embodying computer readable instructions, which when implemented, cause a computer to perform the steps of a method for generating node order fulfillment performance, comprising:

receiving by a computer processor of a customized capacity utilization cost module an electronic record of a current order from a customer at a current time, the computer processor of the customized capacity utilization cost module having program instructions, which when executed by the processor of the customized capacity utilization cost module, performs the steps of:

retrieving data of each node from a plurality of nodes, the retrieved data of each node comprising capacity of a current day and future days, and backlog;

determining current capacity utilization for each node, the current capacity utilization being the percentage of total daily capacity of each node used so far in a current day;

continuously updating the current capacity utilization;

automatically calculating an actual capacity utilization of each node of the plurality of nodes at the current time, the actual capacity utilization being based on the updated current capacity utilization of each node at the current time, the capacity of a current day and future days of each node, and the backlog of each node;

automatically converting the actual capacity utilization of each node of the plurality of nodes and a predetermined maximum amount of cost into a customized capacity utilization cost of the each node using the customized capacity utilization cost module, the predetermined maximum amount of cost is selected to balance capacity utilization across the plurality of nodes;

determining whether the customized capacity utilization cost of the each node is above a predetermined threshold;

obtaining a customized over-capacity cost and increasing the customized capacity utilization cost of the each node in which the customized capacity utilization cost is above the predetermined threshold, the increased customized capacity utilization cost being calculated by adding 1 to the actual capacity utilization, subtracting the predetermined threshold, multiplying by the over-capacity cost and dividing by the total number of items in the current order; and transmitting the customized capacity utilization cost and, when the customized capacity utilization cost is above the predetermined threshold, the increased customized capacity utilization cost, of each node to an order fulfillment engine;

receiving by a computer processor of the order fulfillment engine the electronic record of the current order for node order assignment;

retrieving by the computer processor of the order fulfillment engine the processing cost data of each node from a plurality of nodes, receiving by the computer processor of the order fulfillment engine the customized capacity utilization cost and, when the customized capacity utilization cost is above the predetermined threshold, the increased customized capacity utilization cost, of each node from a plurality of nodes;

automatically calculating a fulfillment cost of each assignment to each of one or more nodes of the plurality of nodes of the current order based on the processing cost data of each node from the plurality of nodes and the customized capacity utilization cost and, when the customized capacity utilization cost is above the predetermined threshold, the increased customized capacity utilization cost, of each node from a plurality of nodes;

identifying one or more assignments to one or more nodes from the plurality of nodes of the current order with the lowest fulfillment cost based on the calculated fulfillment cost; and automatically generating a node order assignment assigning the current order to one or more nodes, selecting the assignment with the lowest fulfillment cost.

10. The non-transitory article of manufacture of claim 9, wherein the actual capacity utilization is calculated by determining the number of days required to process all unit assigned to a node based on the current utilization and capacity of a current day, the backlog, and the planned capacity of future days.

11. The non-transitory article of manufacture of claim 9, wherein the customized capacity utilization cost is calculated by dividing the square of the actual capacity utilization by a total number of items in the current order, and multiplying the predetermined maximum amount of cost to increase balance.

12. The non-transitory article of manufacture of claim 9, wherein the customized capacity utilization cost is further calculated from a normalized actual capacity utilization, computed by normalizing the actual capacity utilization per node across all nodes under consideration so that the maximum value is 1.

* * * * *